United States Patent [19]

Lender et al.

[11] 4,078,157
[45] Mar. 7, 1978

[54] METHOD AND APPARATUS FOR REGENERATING A MODIFIED DUOBINARY SIGNAL

[75] Inventors: Adam Lender, Palo Alto; Henry H. Olszanski, Belmont, both of Calif.

[73] Assignee: GTE Automatic Electric Laboratories Incorporated, Northlake, Ill.

[21] Appl. No.: 733,597

[22] Filed: Oct. 18, 1976

[51] Int. Cl.² ............................................. H04B 3/36
[52] U.S. Cl. ............................. 179/16 EA; 178/70 R; 179/15 AD; 325/13; 325/38 A; 328/164
[58] Field of Search ................... 178/70 R, 70 TS, 68; 179/15 AD, 16 E, 16 EA; 325/13, 38 A, 41, 42; 328/164

[56] References Cited

U.S. PATENT DOCUMENTS

| | | | |
|---|---|---|---|
| 2,996,578 | 8/1961 | Andrews, Jr. | 178/70 TS |
| 3,390,283 | 6/1968 | Hannigsberg | 328/164 |
| 3,585,300 | 6/1971 | Kawashima et al. | 178/70 R |
| 3,590,386 | 6/1971 | Tisi et al. | 325/38 A |
| 3,760,111 | 9/1973 | Sawai | 328/164 |
| 3,798,544 | 3/1974 | Norman | 325/13 |
| 3,993,952 | 11/1976 | Roza | 325/13 |

Primary Examiner—Kathleen H. Claffy
Assistant Examiner—Randall P. Myers
Attorney, Agent, or Firm—Leonard R. Cool; Russell A. Cannon

[57] ABSTRACT

In PCM transmission, it is well known to transmit 24 voice-grade channels at a bit rate of 1.544 Megabits per second (Mb/s). The number of channels which may be transmitted in about the same bandwidth is doubled by the use of correlative level coding, such as the modified duobinary technique. Because of the degradation experienced by the modified duobinary signal in passing over cable pairs, periodic regeneration of the signals is required for effective transmission. The present invention is directed to a regenerative repeater which equalizes, amplifies, reshapes, and retimes the received modified duobinary signal so as to provide a regenerated signal which is nearly identical with that originally transmitted.

7 Claims, 10 Drawing Figures

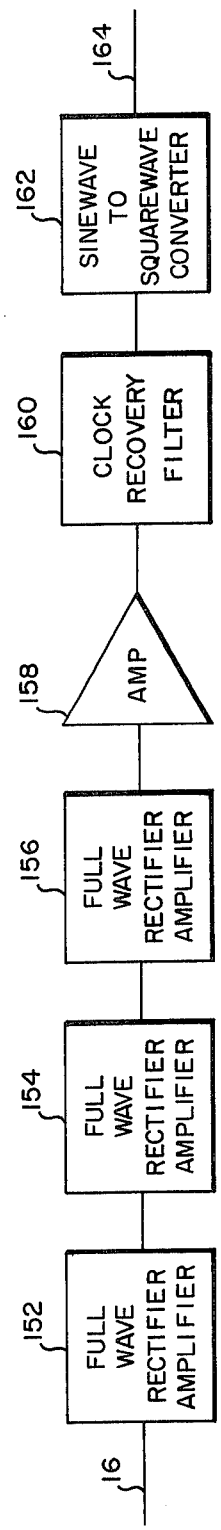
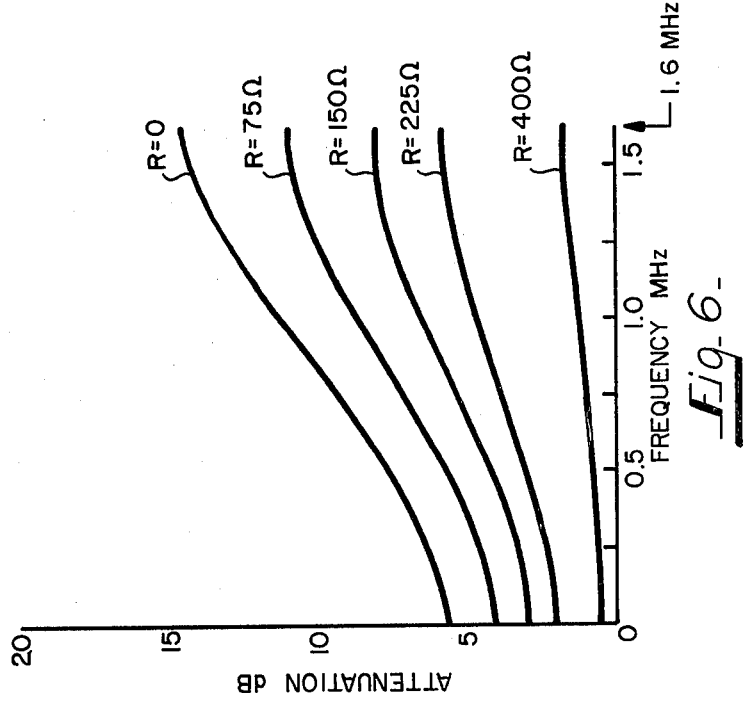

METHOD AND APPARATUS FOR REGENERATING A MODIFIED DUOBINARY SIGNAL

BACKGROUND OF THE INVENTION

1. Field of the Invention

The invention relates to pulse transmission systems, and in particular to the regeneration of signals transmitted via such systems which use correlative level coding for increasing the transmission capability of the system while maintaining the bandwidth to that normally employed in binary transmission systems.

2. Description of the Prior Art

Initially, correlative systems found use in data transmission systems. Most commonly, bit rates in the order of 2400 and 4800 bps were used, and transmission was either over metallic wire pairs or carrier-derived voice channels. In such applications, equalization and regeneration of the correlative level-coded signal was not a basic requirement.

The use contemplated for the present invention is in the repeatered line of a time-multiplexed PCM system. PCM systems, such as the Western Electric T1-type lines, have been employed in commercial telephone service since the early 1960's. Each such system provides 24 voice-grade telephone channels. The system bit rate is 1.544 Megabits per second (Mb/s). Primary use of such systems has been over cable pairs in the exchange plant. In transmitting a 1.544 Mb/s digital signal over cable pairs, the signal becomes so degraded that restoration is required at intervals of about 6,000 feet. Regenerative repeaters have been used, and such repeaters are examplified for prior-art systems by U.S. Pat. No. 2,996,578.

In order to double the transmission capability of the cable pairs, prior-art systems, which have been recently developed, have multiplexed two 24-channel PCM systems for transmission over an exchange cable pair in one direction of transmission. The bit rate is then increased to 3.152 Mb/s, more than double the rate for two systems. This is required because of pulse stuffing, which is employed in the time-multiplexing process. In essence, the capacity of the system is doubled because 48 rather than 24 channels are available for transmission over the repeater span. Because of this, the bit rate over the line is also doubled. For this reason, such conventional 48-channel systems require a new repeater which will operate at the new bit rate and over the greater frequency band. Further, these conventional systems suffer from the problems of substantial additional crosstalk coupling which increases with frequency at the rate of 4.5 dB/octave because of the requirement for higher frequency transmission. Because of this and other factors, the number of 48-channel systems that may be accommodated in a single cable depends upon the pairs in the cable and whether screened cable is employed. In certain applications, the use of two different cables, one for each direction of transmission, is the most desirable approach. Thus, such 48-channel conventional systems have limited applications and in many instances cannot be used to retrofit existing 24-channel lines. In addition to the factors of crosstalk coupling loss, the cable loss is important with respect to the repeater spacing, i.e., the physical distance between successive tandem repeaters. The problems involved relate directly back to the higher bit rate employed for the transmission of the 48-channel PCM group. Engineering considerations for a 48-channel system, which employs a transmission frequency of about 3.152 MHz, are contained in the GTE Lenkurt publication, Section 836-910-073, issue Nov. 1, 1974, a copy of which is attached. The subject GTE Lenkurt publication is incorporated herein by reference.

These problems were overcome by the present invention which provides for transmission of 48 voice-grade channels, provides an effective bit rate of 3.152 Mb/s, but only requires about the same bandwidth for transmission as is employed for a 24-channel system using a binary, i.e., a bipolar, PCM system. Thus, the crosstalk noise problems at higher frequencies are minimized. Further, the invention provides a transmission technique which is a suitable 48-channel retrofit for the 24-channel lines.

SUMMARY OF THE INVENTION

A regenerative repeater for modified duobinary signals includes fixed and variable equalization to compensate for variations in line length and line characteristics, a clock recovery circuit, and a modified duobinary pulse-shaping and timing circuit.

DESCRIPTION OF THE DRAWINGS

FIG. 6 is a graph of the attenuation — frequency characteristics of one section of a variable equalizer as used in the invention.

FIG. 7 is a block diagram of a clock recovery circuit as used in the preferred embodiment of the invention.

DETAILED DESCRIPTION OF THE INVENTION

Figure 1:
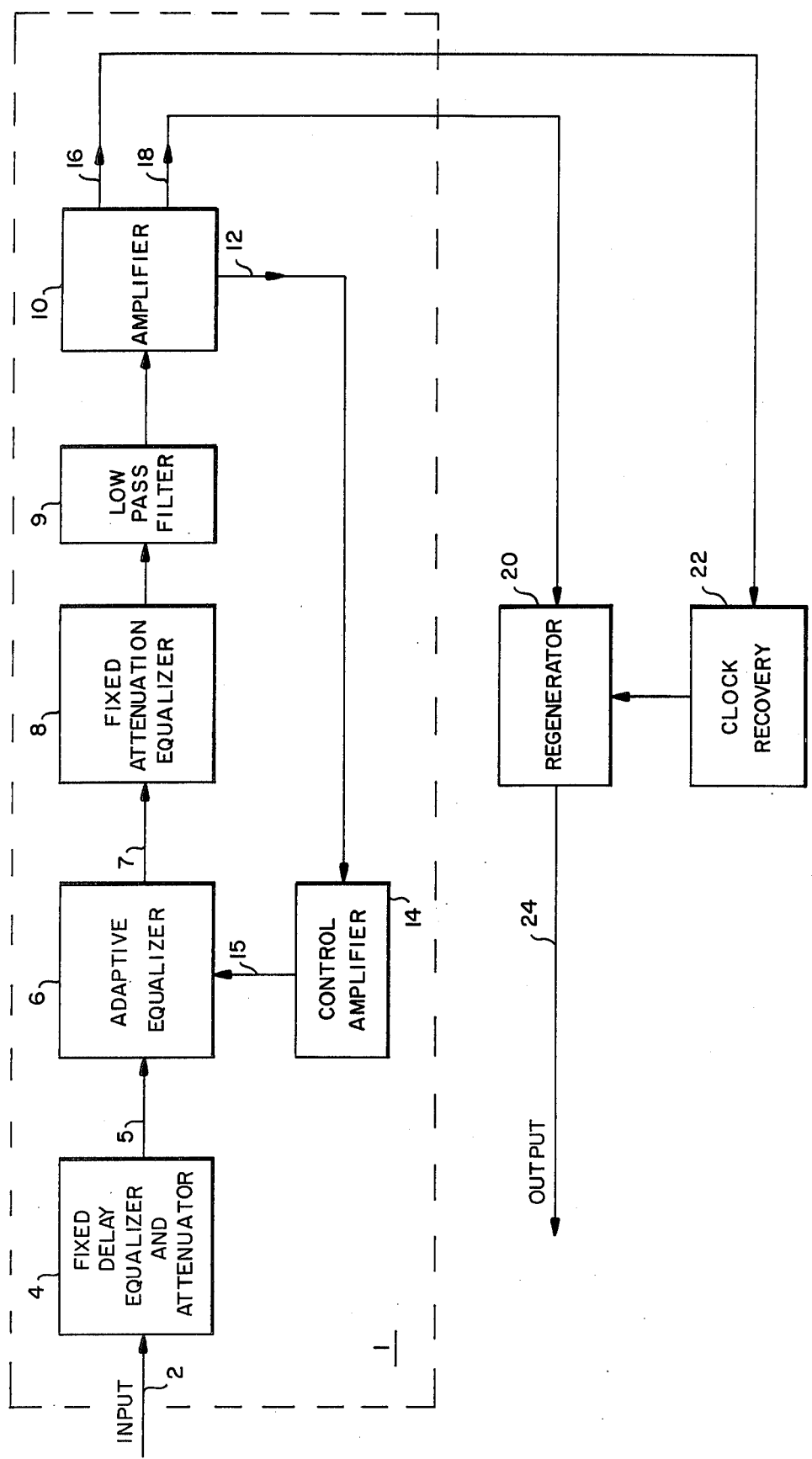
FIG. 1 is a block diagram of an embodiment of the invention.

It is well known that signals transmitted over a cable pair will suffer considerable degradation with respect to amplitude and delay distortion. The function of a regenerative repeater is to accept the degraded signal and to produce, at the output, a replica of the original signal as it was transmitted either from the originating station or the preceding repeater. A block diagram of the preferred embodiment of a regenerative repeater for modified duobinary signals is shown in FIG. 1. For a description of the modified duobinary technique, reference should be made to U.S. Pat. No. 3,457,510 and to U.S. Pat. No. 3,993,953, both of which are incorporated herein by reference.

Not as a limitation, but as a means of particularizing the description, the following discussion will only consider a repeater which is operating at a bit rate of 3.152

Mb/s and providing a channel capacity equivalent to 48 voice-grade channels. Because of the encoding in accordance with the modified duobinary rules using 100% duty cycle pulses, the output power spectrum density has a null at DC and a frequency numerically equal to ½ the bit rate, i.e., 1.576 MHz. Thus, the power spectral density nearly is exactly the same (except for the constant scaling factor) as that for a 24-channel PCM system which employs a bipolar digital signal with 50% duty cycle pulses at a rate of 1.544 Mb/s. Also, as with the bipolar system, the power spectrum peaks at about 772 kHz. The spectral densities for bipolar and modified duobinary pulse trains are derived and compared below.

The general expression for the spectral density of a random pulse train was derived by W. R. Bennett, "Statistics of Regenerative Digital Transmission," Bell System Technical Journal, November 1958, pp. 1501-1543. The expression for spectral density is:

$$W(f) = \frac{1}{T} |G(f)|^2 \{R(O) - m_1^2 + 2\sum_{k=1}^{\infty} [R(k) - m_1^2] \cos 2\pi kfT\} \quad (1)$$

where $G(f)$ = Fourier transform of pulse shape $1/T$ = speed in bits/second, where $T$ is the duration of the pulse time interval in seconds.

$R(k)$ = autocovariance of the pulse sequence.

$m_1$ = average value of the pulse sequence.

Let us assume a binary pulse sequence $a_n$ consisting of binary 1's and 0's represented by 1-volt pulses for binary "1" and no pulses for binary "0." The pulse train is random or can be made nearly random by the use of a self-synchronizing scrambler. If so, then $p(1) = p(0) = \frac{1}{2}$ where $p(.)$ denotes probability. In such a binary pulse train, the digits are independent, uncorrelated so that $$R(k) = 0 \text{ for } k \neq 0 \text{ and} \quad (2)$$

$R(0) = \overline{a^2_n} = \frac{1}{2}$, where the bar over $a^2_n$ denotes average. (3)

Also, $$m_1 = \bar{a}_n = \frac{1}{2}. \quad (4)$$

Substituting (2), (3), and (4) into (1), the spectral density of the binary pulse train denoted by $W_1(f)$ is $$W_1(f) = \frac{1}{4T} |G(f)|^2. \quad (5)$$

To convert (5) to a bipolar and modified duobinary pulse train with three amplitudes +1 volt, 0, and −1 volt, we multiply (5) by the modified duobinary conversion factor $S(f)$ with appropriate subscript B for bipolar and D for modified duobinary. We also use the same subscripts for the pulse shape $G(f)$, which is rectangular with one volt amplitude across 1 ohm impedance for binary "1" or absence of voltage for binary "0." For modified duobinary, this pulse occupies the full time slot T, which is equivalent to 100% duty cycle. For bipolar pulses, only half the time slot is occupied, and therefore bipolar pulses have 50% duty cycle. The bipolar speed is 1/T bits/second, but modified duobinary pulses have a speed of 2/T bits/second. Here, for simplicity we assume an exact ratio between the two speeds of 2 to 1. In practice, this ratio is $$\frac{3.152 \text{ Mbits/sec.}}{1.544 \text{ Mbits/sec.}} = 2.04$$

due to the fact that the time multiplexer preceding the repeatered line introduces a negligibly small amount of stuffed pulses that are later discarded at the receiver. Hence, the error in spectral density in assuming a ratio of 2 instead of 2.04 is negligible.

Based on the above, the spectral densities of bipolar and modified duobinary are:

$$W_B(f) = \frac{1}{T} |G_B(f)|^2 S_B(f) \quad (6)$$

$$W_D(f) = \frac{2}{T} |G_D(f)|^2 S_D(f) \quad (7)$$

where $$G_B(f) = G_D(f) = \frac{T}{2} \frac{\sin \pi fT/2}{\pi fT/2} \quad (8)$$

since the speeds and duty cycles of bipolar and modified duobinary differ by a factor of 2. The conversion factor $S(f)$ for bipolar and modified duobinary are, respectively:

$$S_B(f) = |1 - e^{-j2\pi fT}|^2 \quad (9)$$

$$S_D(f) = |e - e^{-j4\pi fT/2}|^2 = |1 - e^{-j2\pi fT}|^2. \quad (10)$$

Thus, $$S_B(f) = S_D(f). \quad (11)$$

Substituting (8), (9), and (10) into (6) and (7), it is clear that the only difference between $W_B(f)$ and $W_d(f)$ is the constant factor of 2 indicating that for pulses of the same amplitude in both cases, $W_D(f)$ has 3 dB more total power. To make $W_B(f)$ and $W_D(f)$ completely identical in spectral density shape and total power, the amplitude of duobinary pulses can be reduced by a factor to $1/\sqrt{2}$. In both cases of $W(f)$, the necessary bandwidths are approximately 1/T Hz, and energy beyond this frequency is attenuated and negligible. The shapes of spectral densities (6) and (7) in the frequency domain follow the half-cycle sine wave with peak energy at the center of the band and no energy at DC and 1/T Hz.

Referring to FIG. 1, it may be seen that there are three basic functions. The first is item 1, representing the first function which is essentially analog and consists of fixed equalizers, adaptive equalizers, lowpass filter, control amplifier, and amplifier. The second function is clock extraction from the incoming modified duobinary signal, which is semi-analog in nature. The third and the last function is strictly digital and consists of threshold detection, sampling, and regeneration (regenerator 20) of the modified duobinary signal for transmission. The signal input 2 enters fixed delay equalizer-attentuator 4. The fixed delay equalizer is a well-known conventional all-pass network. The attenuator is a conventional resistance network. The output of equalizer-attenuator 4 is followed by two stages of adaptive equalization which are represented as adaptive equalizer 6. The network of 6 will be described in more detail later. The adaptive equalizer 6 equalizes both attenuation and phase since the cable is a minimum phase network. The adaptive equalizer 6 is followed by a fixed attenuation active equalizer which provides a gain reaching approximately 37 dB near the highest frequency within the passband. The fixed attenuation equalizer 8 is followed by lowpass filter 9, which sharply limits the bandwidth to approximately 1.6 MHz, which is the same as for the 24-channel bipolar repeater. The output of the lowpass filter 9 goes to amplifier 10, which is connected as an emitter follower, the output of which is distributed to three points as shown. The first is to the control amplifier 14; the second is to the clock recovery circuit 22, and the third is to the regenerator 20. Each of these circuits will be described in more detail hereinbelow.

Figures 2A, 2B:
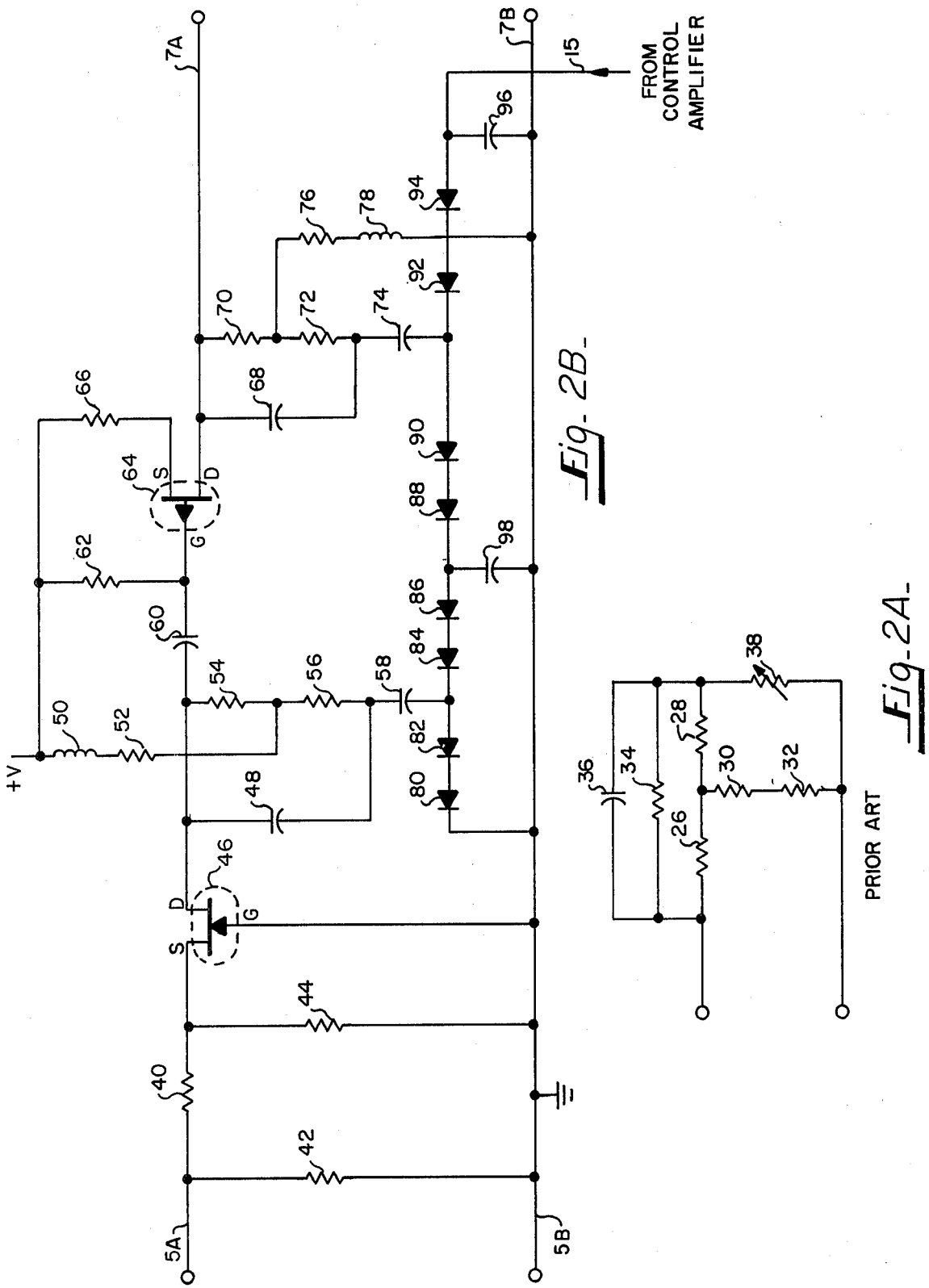
FIG. 2A is a prior-art passive circuit diagram of a basic Bode equalizer.
FIG. 2B shows the essential elements of an active equalizer which follows the general principles of a Bode equalizer.

The correction for variations in delay and loss characteristics of a transmission facility was investigated a number of years ago by H. W. Bode, and his work resulted in U.S. Pat. No. 2,096,027. The variable equalizers of Bode were designed to permit manual correction for these factors, which are exemplified by the minimum-phase characteristics of a cable. In most configurations, the equalizer is controlled by a single variable element, which in most cases is a resistor. A typical circuit configuration of a Bode equalizer is shown in FIG. 2A. The adaptive equalizer actually designed and used is shown in more detail in FIG. 2B, and this is an automatic active circuit and an adaptive modification of a Bode manual network. An advantage of using an active equalizer is that gain may be provided as well as loss over the frequency range of interest. For the preferred embodiment, the fixed equalizer is centered so as to compensate for approximately 26 dB of attenuation at 772 kHz between the transmitting terminal and the repeater input. The adaptive equalizer either adds a loss frequency characteristic or subtracts the desired loss frequency characteristic from that of the cable, depending upon whether the actual span length between the transmitting terminal and the repeater meets that for the average loss as determined by the 26 dB centered loss characteristic.

In FIG. 2B for the adaptive equalizer, a fixed resistive π-pad consisting of resistors 40, 42, and 44 provides impedance matching between the fixed delay equalizer 4 in FIG. 1 and the field effect transistor 46 (FET 46) in FIG. 2B. The FET 46 serves as an isolator between the delay equalizer 4 and the adaptive equalizer 6, both in FIG. 1. It provides a current source to drive the passive network of the adaptive equalizer in FIG. 2B consisting of the inductor 50, resistors 52, 54, 56, capacitors 48, 58, and diodes 80, 82, 84, and 86. The input impedance of the same passive network, as seen from the point connected to the drain (denoted by letter D) at the FET 46, is made to vary with the frequency the same way as the attenuation of the telephone cable. This input impedance is also controlled by the value of the terminating resistance, implemented by series-parallel connection of diodes 80, 82, 84, and 86 in FIG. 2B. This circuit of the automatic equalizer in FIG. 2B corresponds to the manual one shown in FIG. 2A using variable resistor 38. Thus, different values of the terminating resistance correspond to different lengths of the telephone cable. The AC resistance of a diode depends on the value of the DC current flowing through it. By adjusting the value of the DC current flowing through the diodes 80, 82, 84, and 86, it is easy to compensate for attenuation of the length of a telephone cable within the desired range. Voltage developed at the drain D of the FET 46 in FIG. 2B is applied through the biasing network consisting of the capacitor 60 and the resistor 62 to the gate of FET 64. The same voltage causes current flow through the passive network consisting of inductor 78, resistors 70, 72, 76, capacitors 68, 74, and the diodes 88, 90, 92, and 94, constituting the second part of the adaptive equalizer. This second part of the adaptive equalizer is essentially identical in the design and operation to the first part preceding it in FIG. 2B and previously described. The main function of FET 64 is to provide a high input and high output impedance isolation between the two similar adaptive equalizer networks in FIG. 2B. The variable resistance portion of the circuit consists of diodes 80, 82, 84, 86, 88, 90, 92, and 94. The value of the variable resistance is changed by means of a control signal which is a DC output from control amplifier 14 along path 15.

Figure 3:
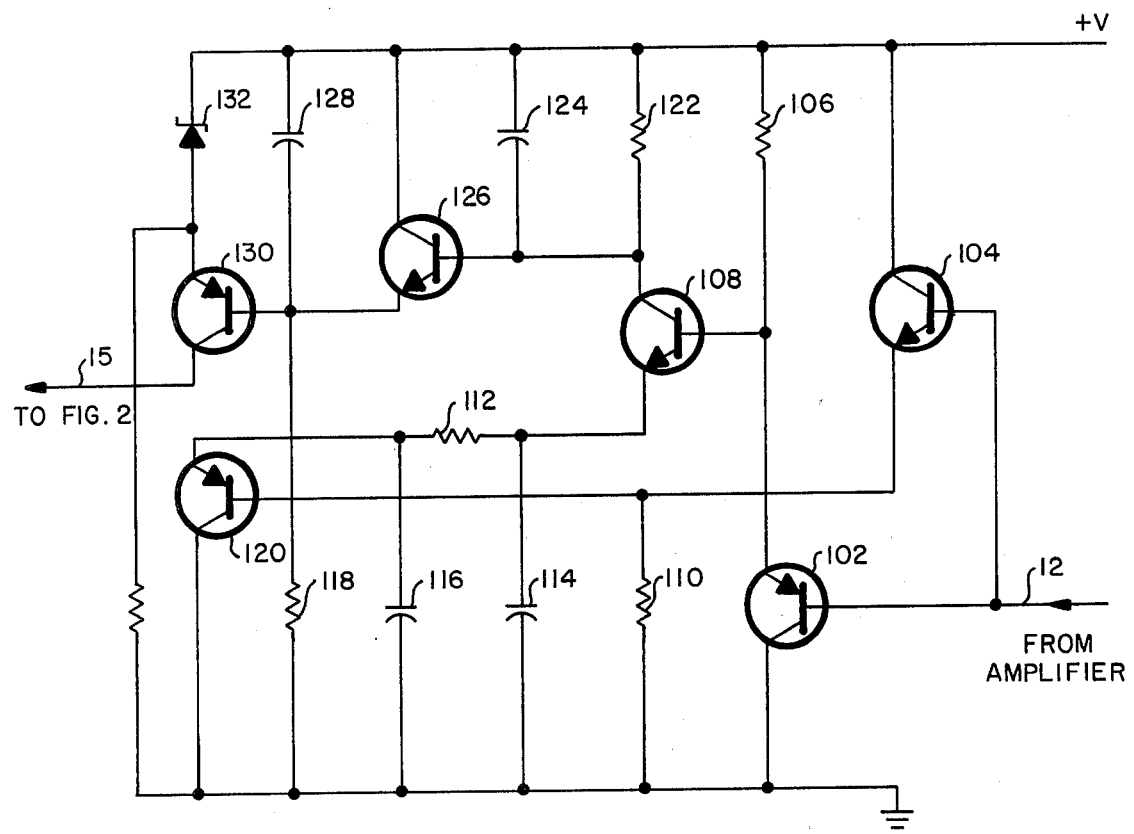
FIG. 3 is a circuit diagram of the control amplifier which provides DC control input to the variable equalizer circuit of FIG. 2B.
Figure 5:
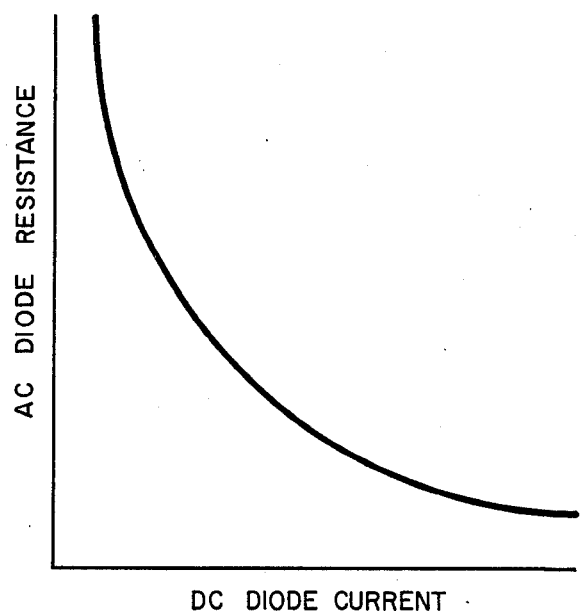
FIG. 5 is a graph of the diode characteristics used in the equalizer of FIG. 2B.
Figure 4:
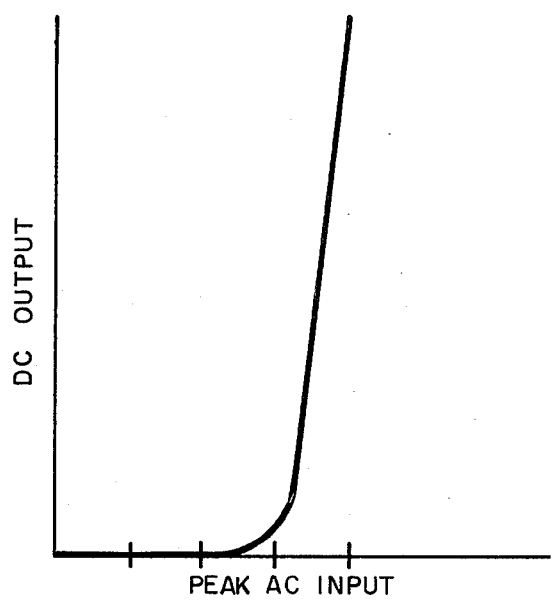
FIG. 4 is a graph of the control amplifier DC output as a function of the peak AC input.

The function of the control amplifier 14 is to convert the peak value of the analog duobinary waveform to a direct-current amplitude at the output of transistor 130. A circuit for performing this function is shown in FIG. 3. Control amplifier transistors 102, 104, 108, and 120 rectify the duobinary waveform applied at input 12. The remaining elements operate to develop a direct-current output which is proportional to the peak value of the duobinary signal. It is readily apparent that the peak voltage of the duobinary signal is proportional to the attenuation of the cable at 772 kHz. Consequently, the attenuation of the cable at 772 kHz is, in effect, measured by the control amplifier, and this information is converted to direct current at the output of transistor 130. In turn, this current which is proportional to the cable attenuation is supplied to the eight diodes 80, 82, 84, 86, 88, 90, 92, and 94. Change in the current through these diodes results in the change of the resistance of the diodes. Typical control amplifier characteristics are shown in FIG. 4, and typical diode characteristics are shown in FIG. 5. The AC resistance of the diodes ranges from 10 ohms to 500 ohms, corresponding to the necessary range of the variable element in the adaptive equalizer network. A variable equalizer characteristic for various values of resistance for one section of an equalizer is shown in FIG. 6.

As noted hereinabove, the signal passes from the variable equalizer through path 7, fixed attenuator equalizer 8, lowpass filter 9, and amplifier 10. Control amplifier 14 is directly connected from the emitter-follower amplifier 10 via path 12. However, the outputs to the regenerator 20 and clock recovery 22 are obtained from a multi-winding transformer. Referring now to FIG. 7, the modified duobinary signal on path 16 is sequentially applied to full-wave rectifier-amplifier circuits 152, 154, and 156, which will be described in more detail later. Because of the three rectification stages plus amplification, the input to amplifier 158 has a very strong component at the bit rate of 3.156 MHz. This component is extracted by the clock recovery filter which preferably should be of the quartz crystal type with an effective Q in the order of 800 to 1,000 so as to provide a strong sinusoidal component with an amplitude of about 3 volts and with a jitter in the order of less than 5 nanoseconds to the sine-wave to square-wave converter 162. Such converters are conventional and well known, and are not shown in detail herein. The output is a square-wave clock on path 164.

Figure 8:
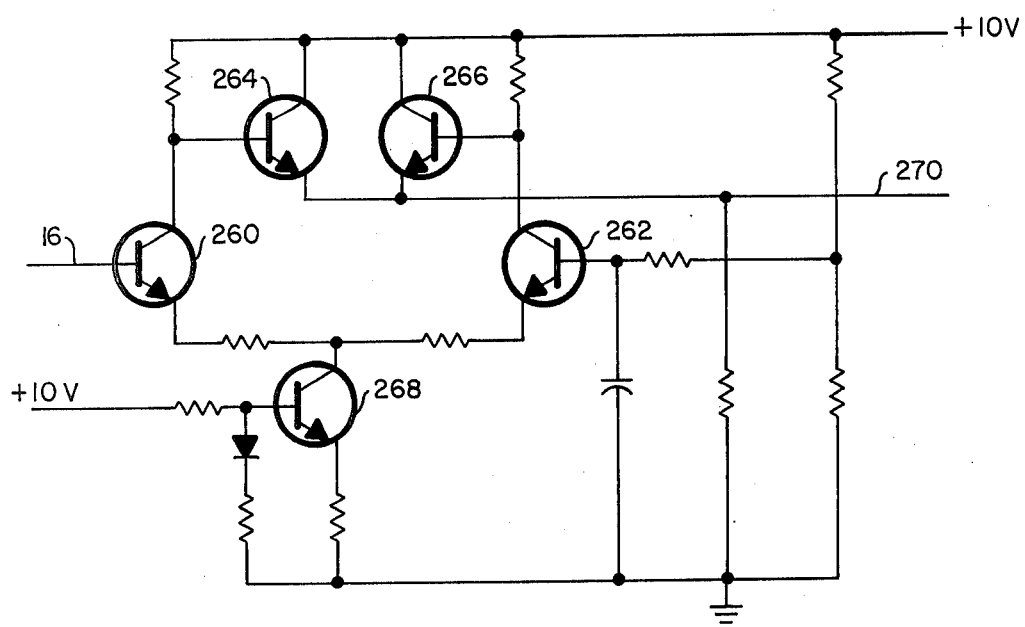
FIG. 8 is a circuit diagram of a full-wave rectifier-amplifier such as is used in the clock recovery circuit.

With respect to the rectifier-amplifier, a circuit of one such amplifier as used in the preferred embodiment of the invention is shown in FIG. 8. Each full-wave rectifier-amplifier 152, 154, and 156 employs a circuit arrangement such as that shown in FIG. 8. Note that each stage consists of five transistors and represents a very highquality rectifier-amplifier. The input at the base of transistor 260 is the modified duobinary waveform, and it is amplified by transistors 260 and 262 and rectified by transistors 264 and 266 to provide rectified outputs at the emitters of said transistors. Transistor 268 is used to supply a direct-current reference source.

Figure 9:
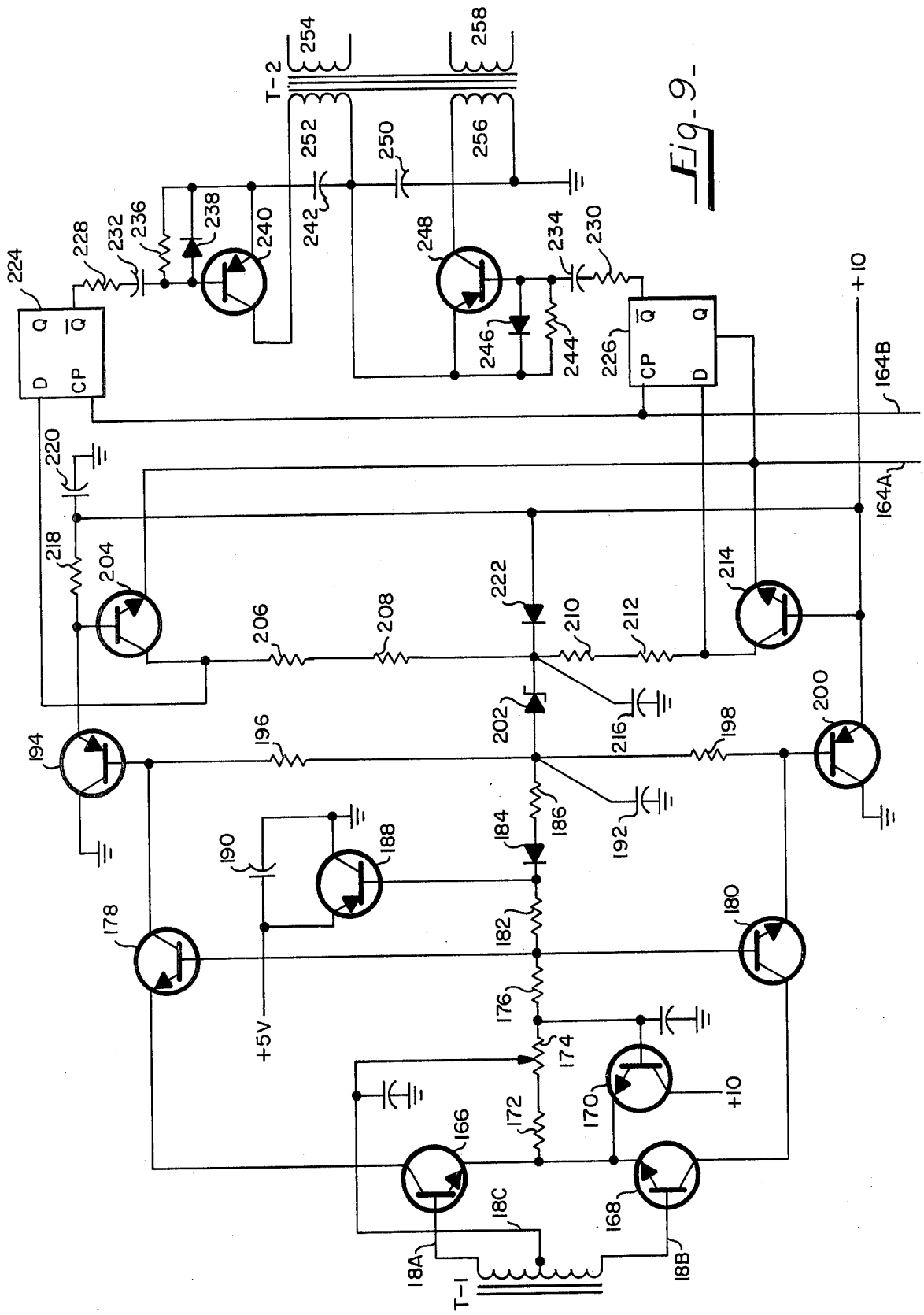
FIG. 9 is a circuit diagram of the modified duobinary pulse-shaping and timing circuit as used in the preferred embodiment of the invention.

Referring now to FIG. 9, it may be seen that the output of amplifier 10 has been shown in more detail so as to indicate the transformer output connection to regenerator 20. The inputs on paths 18A and 18B are applied, respectively, to the bases of transistors 166 and 168. These transistors slice the signal midway in opposite phases, with the slicing level being adjusted by potentiometer 174. The sliced signal is further amplified in either transistor 178 or transistor 180, and the amplifier output is applied to the respective bases of transistors 194 and 200, which are operating as emitter-followers. Further amplification of the sliced signal is obtained from the amplifiers consisting essentially of transistors 204 and 214 and associated components. Note that the basic form of the duobinary three-level signal is retained and a clear distinction is maintained between the positive pulses and negative pulses as they finally appear at either input D of flip-flop 224 or input D of flip-flop 226. The clock input from clock recovery circuit 22 is applied via path 164B to the clock inputs of the flip-flops 224 and 226. The positive or negative voltages derived from the modified duobinary waveform are sampled by the clock using flip-flops 224 and 226 so that at the point $\overline{Q}$ of flip-flop 224 appears the regenerated positive pulse and at point $\overline{Q}$ of the flip-flop 226 the regenerated negative pulse. These are, in turn, used to saturate cut-off transistors 240 and 248, respectively. When one of these two transistors is saturated, a rectangular pulse output appears at the output of transformer T-2. Consequently, the output of transformer T-2 has a regenerated duobinary rectangular waveform with a 100% duty cycle. The jitter of the waveform is equal to the jitter of the regenerated clock of the repeater.

While the invention has been particularly shown and described with reference to a preferred embodiment thereof, it will be understood by those skilled in the art that changes in form and detail may be made therein without departing from the spirit and scope of the invention.

What is claimed is:

1. Apparatus for regenerating a modified duobinary signal from such a signal degraded during transmission over a transmission path which comprises:
    means for automatically equalizing for phase delay and attenuation of said degraded line signal;
    means for selecting the equalized modified duobinary signal from said automatic equalizing means;
    means for amplifying the selected equalized signal;
    means for generating a timing signal from said amplified line signal; and
    means connected to said generating means and said amplifying means for retiming and reshaping said amplified equalized signal to obtain a regenerated modified duobinary signal.

2. Apparatus according to claim 1 wherein said automatic equalizing means further comprises:
    a fixed phase delay equalizing means having an input connected to receive the degraded line signal and having an output;
    a fixed attenuation equalizer having an input connected to the output of said fixed phase delay equalizing means; and
    an adaptive phase delay and attenuation equalizing means having an input connected to the output of said fixed attenuation equalizing means and having an output.

3. Apparatus according to claim 2 wherein said selecting means further comprises:
    a lowpass filter having an input connected to said equalizing means and an output, the passband of said filter being approximately equal to one-half the bit rate of said modified duobinary signal.

4. Apparatus in accordance with claim 3 wherein said means for generating a timing signal further comprises:
    means for rectifying and amplifying said amplified signal to obtain a strong signal having a frequency which is equal to the bit rate;
    means for separating said strong signal from those present at the output of said rectifying and amplifying means; and
    means for converting said separated strong signal into a square-wave timing signal.

5. Apparatus in accordance with claim 4 wherein said retiming and reshaping means further comprises:
    means for slicing the output signal from said amplifying means to obtain positive- and negative-going pulses;
    means for amplifying pulses; and
    means for shaping said pulses to obtain a regenerated duobinary signal having a rectangular waveform.

6. Apparatus in accordance with claim 4 wherein said means for rectifying and amplifying further comprises:
    a three-stage rectifier-amplifier, each stage comprising
    a DC reference voltage;
    a DC supply voltage;
    a first transistor having an input signal connected to the base, the emitter connected via a resistor to said reference voltage, and a collector providing a rectified output;
    a second transistor having a base connected to said supply voltage, an emitter connected via a resistor to said reference voltage, and a collector providing a rectified output which is out-of-phase with that from said first transistor,
    a third and a fourth transistor connected as an emitter-follower pair, having the emitters connected together to provide the output, the collectors connected together and to said supply voltage, the base of the third transistor connected to the collector of said first transisor, and the base of said fourth transistor connected to the collector of said second transistor.

7. Apparatus according to claim 2 wherein said adaptive phase delay and attenuation equalizing means further comprises:
    a control amplifier, having an input connected to the output of said amplifying means, said control amplifier comprising:
    means for rectifying the input signal;
    means for converting the rectified signal into a direct current which is representative of the peak amplitude of the input signal;
    and resistance means responsive to said direct current for changing the phase delay and attenuation so as to compensate for variations in phase delay and attenuation in the transmission path.

* * * * *